United States Patent [19]

Cochran

[11] 4,255,936
[45] Mar. 17, 1981

[54] HEAT PUMP WATER HEATER

[76] Inventor: Robert W. Cochran, P. O. Box 368, Lakeland, Fla. 33802

[21] Appl. No.: 953,038

[22] Filed: Oct. 20, 1978

[51] Int. Cl.³ .............................................. F25B 27/02
[52] U.S. Cl. ..................................... 62/238.7; 62/260; 165/45
[58] Field of Search .................. 237/2 B; 62/260, 160, 62/238 E, 511, 324; 165/45; 126/400; 137/363

[56] References Cited

U.S. PATENT DOCUMENTS

| | | | |
|---|---|---|---|
| 2,448,315 | 8/1948 | Kunzog | 62/511 |
| 2,693,939 | 11/1954 | Marchant et al. | 165/45 |
| 2,968,934 | 1/1961 | Komedera | 62/506 |
| 3,175,370 | 3/1965 | Schlumberger et al. | 62/260 |
| 3,564,862 | 9/1969 | Hashemi et al. | 62/260 X |
| 3,965,694 | 6/1976 | Vignal et al. | 62/260 |
| 4,012,920 | 3/1977 | Kirschbaum | 237/2 B |
| 4,049,407 | 9/1977 | Bottum | 237/1 A |

FOREIGN PATENT DOCUMENTS

| | | | |
|---|---|---|---|
| 487762 | 4/1918 | France | 62/260 |
| 59350 | 2/1912 | Sweden | 62/260 |

*Primary Examiner*—Albert J. Makay
*Assistant Examiner*—Henry Bennett
*Attorney, Agent, or Firm*—Duckworth, Hobby, Allen & Pettis

[57] ABSTRACT

The heating system of the present invention includes a compressor for compressing and heating refrigerant. The pressurized, heated refrigerant is passed through a first heat exchanger which is coupled to a container of water. A pump circulates water from the container through the first heat exchanger to transfer heat from the refrigerant through the heat exchanger to the water. This heat exchange process cools and condenses the refrigerant from a gas to a liquid as the water is heated. The liquified refrigerant is transferred to a coaxial earth tap which includes an inner passageway for transferring the refrigerant from the upper end to the lower end of the earth tap and a restrictor positioned at the lower end of the tap for vaporizing the refrigerant. The vaporized refrigerant passes from the lower end to the upper end of the earth tap through an outer passageway which is thermally coupled to a heat source to transfer heat from the heat source to the cool, vaporized refrigerant to increase the temperature of the refrigerant. The heated vaporized refrigerant is returned to the inlet side of the compressor. A second heat exchanger may be positioned between the first heat exchanger and compressor, and the earth tap to transfer heat from the hot liquid refrigerant flowing from the first heat exchanger to the earth tap to the cooler, vaporized refrigerant flowing from the earth tap to the inlet of the compressor.

16 Claims, 5 Drawing Figures

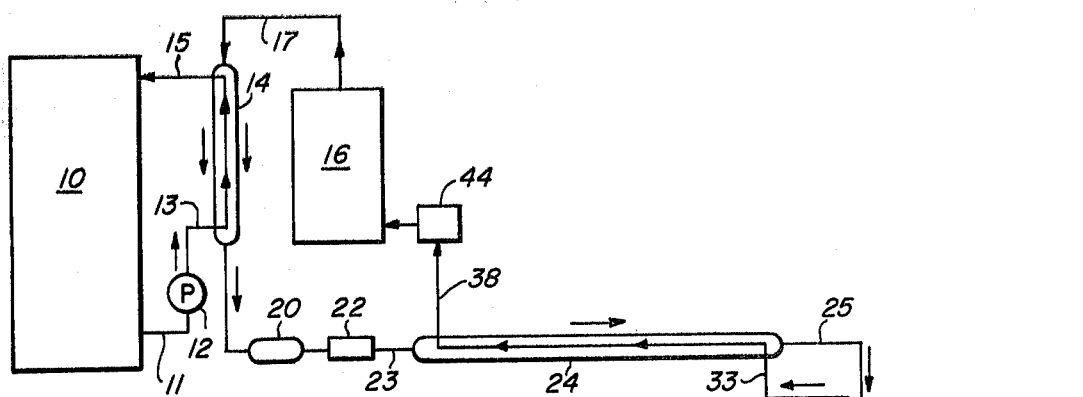
Fig. 1
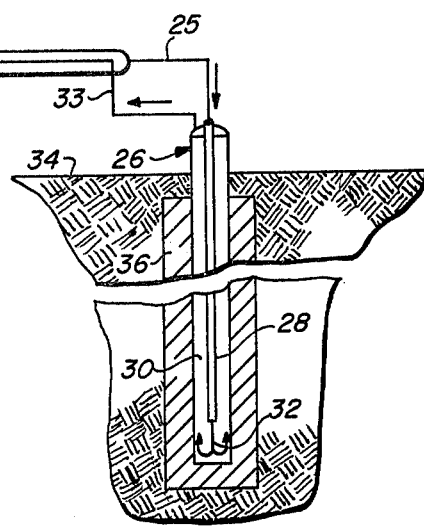
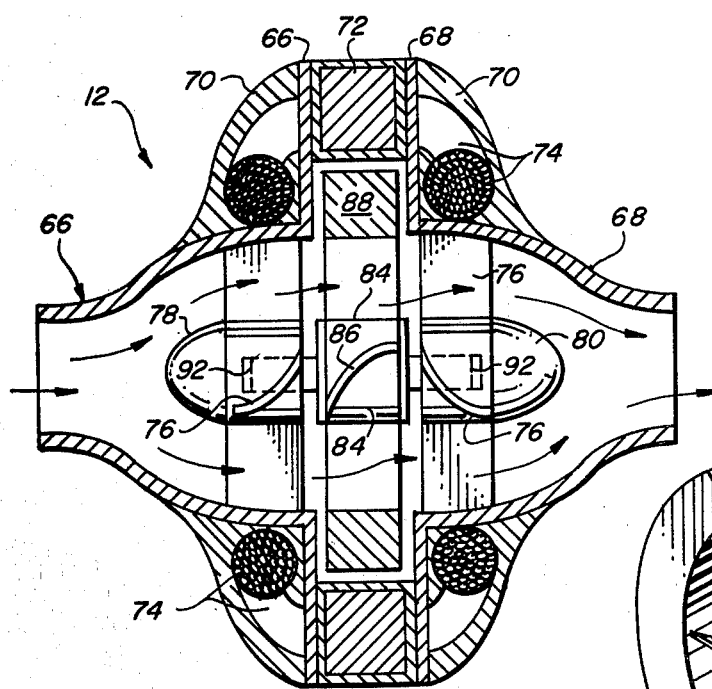
Fig. 4
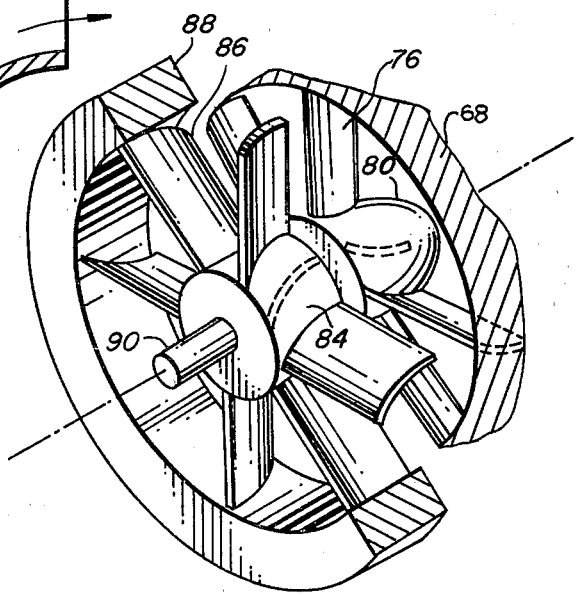
Fig. 5

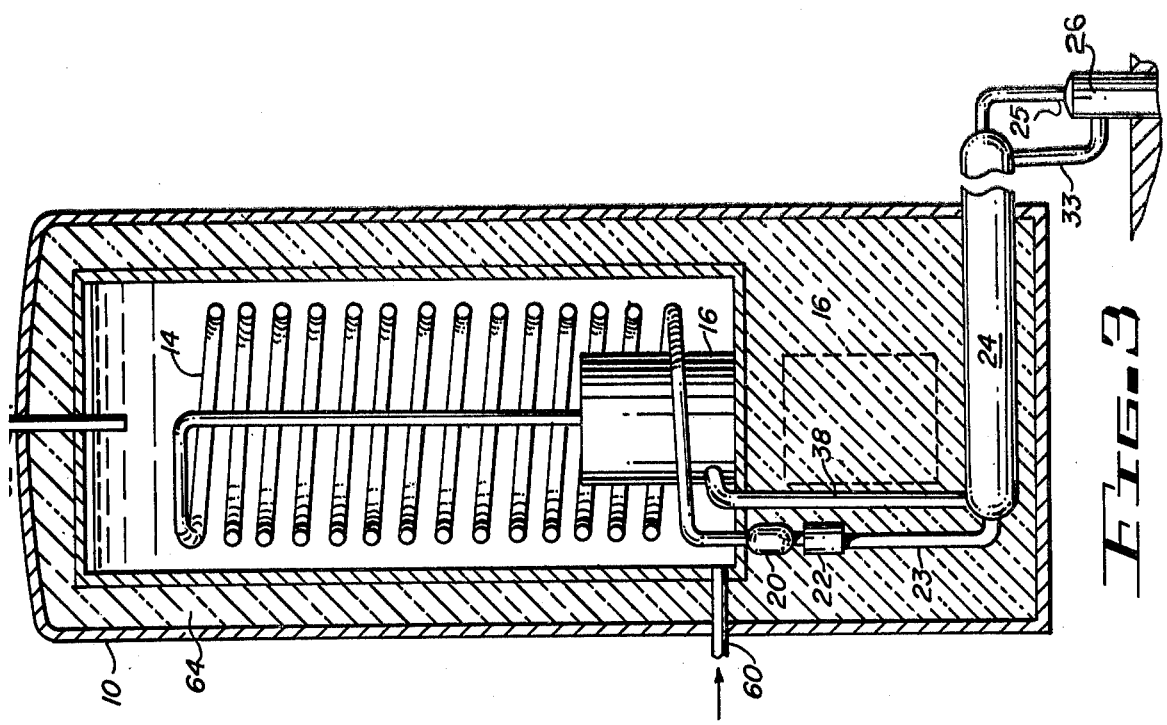
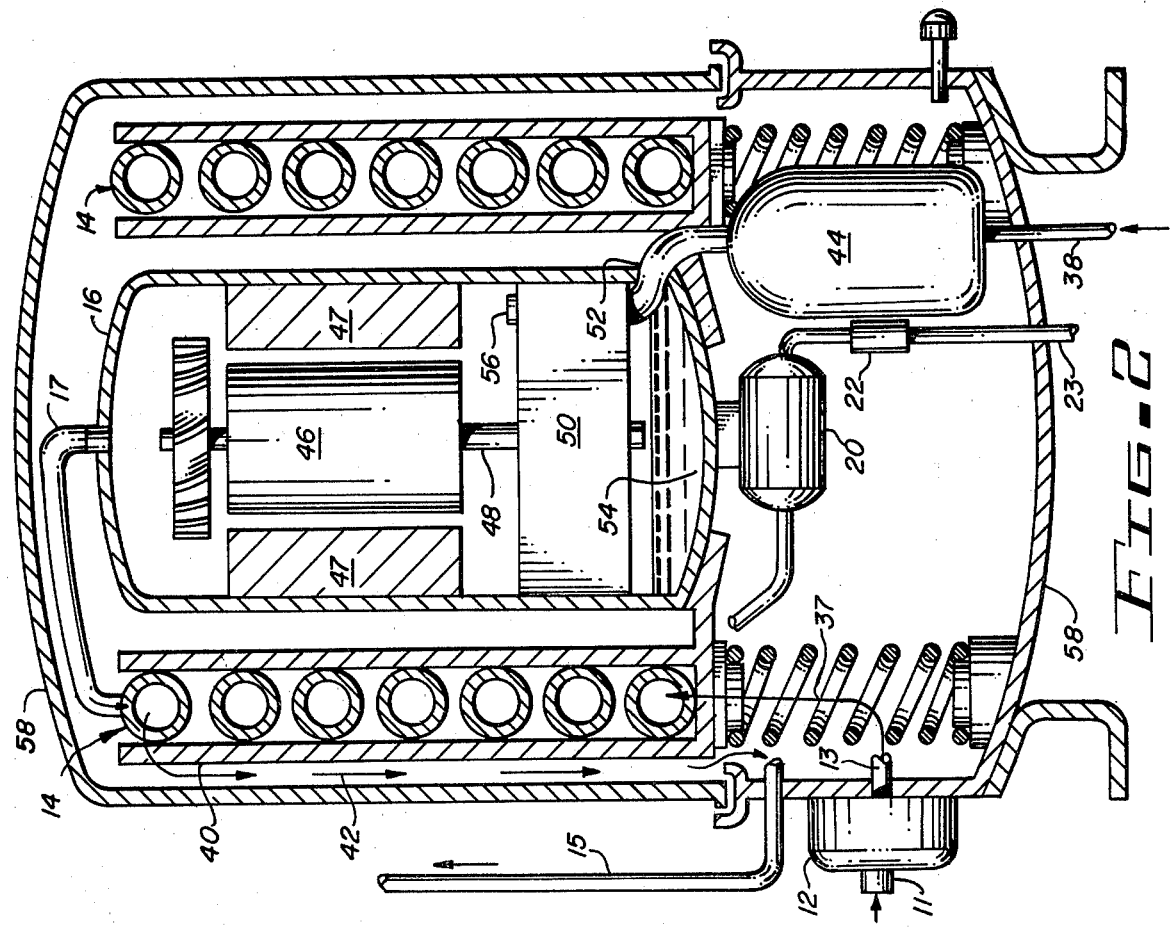

HEAT PUMP WATER HEATER

BACKGROUND OF THE INVENTION

1. Field of the Invention

The present invention relates to heating devices, and in particular, relates to heat pump heating devices which utilize stored thermal energy within the earth.

2. Description of the Prior Art

The prior art includes a number of references which teach the use of a heat pump to recover thermal energy stored in the earth.

U.S. Pat. No. 3,965,694 (Vignal) discloses an apparatususable either for heating or cooling which includes a compressor for compressing a refrigerant. A first heat exchanger transfers heat between the refrigerant and the atmosphere, while a second subterranean heat exchanger transfers heat between the earth and the refrigerant. A capillary tube restricting device is positioned in the refrigerant line between the first and second heat exchangers to liquify the refrigerant before it reaches the subterranean heat exchanger.

U.S. Pat. No. 2,513,373 (Sporn) discloses a heat pump system for either heating or cooling water or air. This system utilizes a closed circuit refrigerant line. A closed circuit water line circulates water through a pair of subterranenan heat exchangers. A heat exchanger which is coupled to both the closed circuit refrigerant line and the closed circuit water line transfers heat energy between the independent water and refrigerant systems. Depending on the operating mode of the system, heat is either transferred from the earth to the refrigerant or from the refrigerant to the earth.

U.S. Pat. No. 2,529,154 (Hammond) discloses a solar heating system. Water is circulated within a closed system coupled to a solar energy heat absorber. The refrigerant is circulated through a second closed system. A heat exchanger is provided to transfer heat from the water system to the refrigerant system.

U.S. Pat. No. 3,392,541 (Nusbaum) discloses an air conditioning/heating system having a plurality of compressors and heat exchangers.

SUMMARY OF THE INVENTION

The present invention contemplates a system for heating a first fluid stored within a container. A compressor compresses and heats a second fluid. A heat exchanger which is coupled with the container transfers heat between the first and second fluid. Means is provided to circulate the first fluid through the heat exchanger to transfer heat from the second fluid through the heat exchanger to the first fluid to thereby cool and condense the second fluid from a gas to a liquid as the temperature of the first fluid is increased. A coaxial earth tap is coupled to the heat exchanger and to the compressor and includes upper and lower ends. An inner passageway transfers the liquified second fluid from the upper end to the lower end of the earth tap. Means is provided at the lower end of the earth tap to vaporize the liquified second fluid. An outer passageway is thermally coupled with a heat source to transfer heat from the heat source to the vaporized second fluid to increase the temperature of the second fluid as the second fluid travels from the lower to the upper end of the earth tap. The warmed, vaporized second fluid is then transferred to the input of the compressor.

An additional aspect of the present invention contemplates an improved circulating means having a cylindrical housing which is coupled in series with a conduit through which the first fluid circulates. The circulating means also includes a hub and means for supporting the hub in the central portion of the housing. An electromagnetic rotor is rotatably coupled to the hub and includes a vane for propelling the fluid through the circulating means as the rotor turns. Electromagnetic stator means is coupled about the circumference of the housing for generating an alternating electromagnetic field within the interior of the housing to induce rotation of the rotor, whereby fluid is forcefully circulated through the circulating means.

DESCRIPTION OF THE DRAWINGS

The invention is pointed out with particularity in the appended claims. However, other objects and advantages together with the operation of the invention, may be better understood by reference to the following detailed description taken in connection with the following illustrations wherein:

FIG. 1 is a schematic diagram of a heat pump water heater of the present invention.

FIG. 2 is a sectional view, partly schematic in form, of several primary elements of the present invention.

FIG. 3 illustrates an alternative embodiment of the present invention in which the compressor and heat exchanger are positioned within the hot water storage tank.

FIG. 4 is a sectional view of an improved fluid circulating pump usable in the present invention.

FIG. 5 is a partly cut away, perspective view of the rotor and guide vane assembly of the pump shown in FIG. 4.

DESCRIPTION OF THE PREFERRED EMBODIMENT

In order to better illustrate the advantages of the invention and its contributions to the art, a preferred hardware embodiment of the invention will now be described in some detail.

Referring to FIG. 1, the heater of the present invention incorporates a first circuit in which a first fluid circulates and a second closed circuit in which a second fluid circulates. The first closed circuit includes a hot water tank 10 which stores heated water. A pump 12 circulates the water in tank 10 through lines 11 and 13 to heat exchanger 14 and returns the heated water through line 15 to the upper portion of tank 10.

The second closed circuit includes a compressor 16 which compresses a fluorocarbon refrigerant such as Freon. The heated compressed refrigerant gas is transferred through line 17 to heat exchanger 14 where it is cooled and condenses into a high pressure, liquified refrigerant. This pressurized liquid refrigerant is passed through a strainer 20 and then to a restrictor such as a capillary tube, 22. Restrictor 22 maintains a high refrigerant pressure in heat exchanger 14 which increases the condensing efficiency of that heat exchanger.

The liquid refrigerant passes through line 23 to another heat exchanger 24 and then through line 25 to earth tap 26. Earth tap 26 is of a coaxial design having a vertically oriented inner cylindrical passageway 28 and a concentrically positioned larger diameter outer passageway 30.

The refrigerant entering the upper end of earth tap 26 is at a temperature of between 40 to 75 degrees F. and a pressure of 180 to 300 PSI. This pressurized liquid refrigerant is transferred from the upper portion to the lower portion of the inner cylindrical passageway 28 and is discharged through a narrow diameter restrictor 32 positioned at the lower end of passageway 28. A pair of curved arrows indicate the flow path out of the lower end of restrictor 32 into outer passageway 30. Restrictor 32 works in conjunction with restrictor 22 to maintain the high refrigerant pressure in heat exchanger 14 and also serves to prevent the liquid refrigerant from vaporizing in heat exchanger 24. The liquid refrigerant discharged from restrictor 32 into outer passageway 30 vaporizes and is cooled to a temperature of approximately 34 degrees F., thereby enabling the refrigerant to absorb heat from the earth through the outer passageway. The pressure of the vaporized refrigerant is reduced to a level of about 75 PSI.

As the cooled, depressurized refrigerant circulates from the lower end to the upper end of outer passageway 28, it is warmed to a temperature of about 50 degrees F. and is then transferred by line 33 to heat exchanger 24. The comparatively cool gaseous refrigerant from earth tap 26 is further warmed in heat exchanger 24 by the warmer liquid refrigerant passing from heat exchanger 14 to earth tap 26. Line 38 transfers the vaporized refrigerant from heat exchanger 24 to compressor 16. The refrigerant gas entering the input side of compressor 16 after being warmed by heat exchanger 24 is at a temperature of approximately 70 degrees F. while the pressure is maintained at a level of approximately 65 to 70 PSI. This refrigerant is againt compressed and heated by compressor 16, thereby completing the continuous cycle of the refrigerant. A further function of heat exchanger 24 is that it serves to transport the second fluid to and from the earth tap which is located remote from the compressor and heat exchanger 14.

Earth tap 26 is generally 50 to 60 feet in length and is buried in the ground. Reference number 34 designates the surface of the earth. A material 36 having a high thermal conductivity may be positioned around the exterior of earth tap 26 in order to substantially increase the surface area of the earth or subterranean water in contact with the earth tap. Since the temperature of the earth surrounding material 36 is generally substantially warmer than the 35 degree F. gaseous refrigerant circulating upward from the lower portion of outer passageway 30, heat is transferred from the earth or water surrounding material 36 into the cool refrigerant in outer passageway 30.

Providing separate restrictors 22 and 32 as shown produces improved efficiency in comparison with the more typical method of positioning a single restrictor between heat exchanger 14 and the heat source as is more typical with prior art devices. Positioning restrictor 22 between the outlet of heat exchanger 14 and the inlet of heat exchanger 24 causes a higher back pressure in heat exchanger 14 causing more efficient condensation of the heated refrigerant therein. Heat exchanger 24 is also prevented from acting an extension of heat exchanger 14 as a result of the positioning of restrictor 22, as restrictor 22 forces all the refrigerant to condense to a liquid before it leaves heat exchanger 14.

Referring now to FIG. 2, a partial sectional diagram of an actual physical embodiment of the present invention shown schematically in FIG. 1 is illustrated. The water to be heated is transported through line 11 to pump 12. Line 13 couples the water transferred by pump 12 to heat exchanger 14. Arrow 37 indicates the connection of line 13 to heat exchanger 14.

Heat exchanger 14 is illustrated in cross section and is formed from a coil of concentric tubular conduits as shown. The water to be heated is circulated through the smaller diameter inner passageway while the hot refrigerant gas circulates and condenses in the outer, larger diameter portion of the coil. The coil of heat exchanger 14 is maintained in position and supported by bracket 40. The arrows indicated by reference number 42 designates a conduit which transports the heated water from the end portion of heat exchanger 14 to line 15 which returns the heated water to hot water tank 10.

The low pressure refrigerant gas is transferred to the unit indicated in FIG. 2 by line 38. The gas then passes through an accumulator 44 and is then transferred to compressor assembly 16. The rotor 46 of an electric motor drives a shaft 48 which turns the compressor element 50. Line 52 transfers the refrigerant from accumulator 44 to compressor element 50. An oil sump 54 is positioned in the lower part of compressor assembly 16. The heated, compressed refrigerant gas exits port 56, passes through the elements 46 and 47 of the motor to provide cooling of the motor and is transferred by line 17 to the outer passageway of heat exchanger 14. As can be seen, the compressor assembly 16 and heat exchanger 14 are shock mounted by a plurality of springs which support the assembly within the interior of an evacuated container 58. Evacuation of container 58 serves to prevent condensation, rust, collection of dust, heat loss from all internal parts, and transmission of noise from the compressor assembly to the housing 58, as the interior of the housing is absent of all air and moisture. The cooled, liquified refrigerant passes from the lower portion of the outer passageway of heat exchanger 14 and is coupled to strainer 20 and then to restrictor 22. Line 23 transfers the condensed, cooled refrigerant to heat exchanger 24 which is located outside of container 48.

It is often desirable to fabricate heat exchanger 24 so that it is of a sufficient length to span the distance between the point at which line 23 exits container 58 and the upper portion of the earth tap, which is typically positioned some distance from the assembly indicated in FIG. 2. In the preferred embodiment, heat exchanger 24 may typically be about twenty-five feet in length.

Referring now to FIG. 3, an alternative embodiment of the present invention is disclosed. In this embodiment compressor 16 is positioned within the interior of hot water tank 10 together with heat exchanger 14. Heated water is discharged from outlet line 62, as unheated water enters the hot water tank 10 through supply line 60. Refrigerant lines 25 and 33 transfer refrigerant to and from earth tap 26; heat exchanger 24 may physically extend to the vicintiy of the earth tap.

In the embodiment shown in FIG. 3, an efficiency improvement is obtained since pump 12 and several water and refrigerant lines are eliminated. When a "rotary" compressor is used, such as compressor 16 in FIG. 2, a further gain in efficiency is obtained by locating the compressor 16 within the tank 10 to dissipate waste heat from the motor directly into the water. The internal structure of heat exchanger 14 is substantially simplified since only the heated refrigerant circulates through the interior of the heat exchanger. The direct contact between the exterior surface of heat exchanger 14 and the water within tank 10 improves efficiency and provides the necessary heat transfer between heat exchanger 14 and the water.

A layer of insulation 64 is positioned between the exterior and interior of water tank 10 to prevent unnecessary heat loss. The compressor 16 may alternately be located as shown by dotted lines in the insulated space between the exterior and interior surfaces of tank 10.

Referring now to FIG. 4, a specific embodiment of pump and motor 12 is illustrated. Although many types of pumps may be used to circulate the water from tank 10 to heat exchanger 14, the embodiment illustrated in FIG. 4 has the advantage that seals between the moving elements of the motor and the interior of the pump itself are eliminated. Motor-pump 12 is electrically powered and includes a generally cylindrical housing having elements 66, 72 and 68.

The stator element of the electric motor is formed by a cylindrical section of magnetic material 72, which is coupled around the circumference of motor-pump 12 between housing elements 66 and 68. An electrical winding 74 is wound around material 72 and coupled to a source of alternating current power in order to induce a magnetic field in element 72 and thereby create an alternating magnetic field within the interior of motor-pump 12.

Referring now also to FIG. 5, a plurality of guide vanes 76 support a first stationary hub 78 and a second stationary hub 80 in the central portion of housing 66 and 68. Guide vanes 76 direct and redirect the flow of fluid through the interior of the chamber formed by the housing 66 and 68.

A rotor element 84 includes a plurality of blades 86 and a cylindrical section of magnetic material 88 around the periphery of blades 86. A shaft 90 extends from each end of rotor 84 into a bearing surface 92 within the interior of hubs 78 and 80.

A flow of alternating current through coil 74 energizes magnetic material 72, creating an alternating magnetic field within the interior of motor pump 12. A magnetic field is also induced in the magnetic material 88 causing a tangential force which rotates rotor 84, 86 and 88 and causes blades 86 to direct a flow of water through motor pump 12. The coil 74 is encapsulated by an insulating adhesive 70, such as epoxy, for mechanical protection and conduction of heat losses into the housing 66 and 68.

A water tight seal is readily formed between elements 66 and 68 of the housing. Magnetic material 72 is joined between these two elements by some type of adhesive such as epoxy in order to form the required water tight seal therebetween. The unique design of pump and motor 12 avoids the use of high pressure fluid seals on moving elements of the pump. The contact between shaft 90 and the bearing surfaces within hubs 78 and 80 is the only significant frictional coupling between rotating and stationary elements of the invention, and the pressure differential between the prior art conventional pumps and motors has been eliminated as a result of the elimination of seals for rotary elements. An additional benefit of the present configuration is that the flow of water through motor pump 12 removes the electrical and mechanical heating losses and permits the motor to run at a substantially cooler than normal temperature, while keeping the energy resulting from the losses within the closed circuit of the water being circulated.

It will be apparent to those skilled in the art that the disclosed heat pump water heater and pump motor may be modified in numerous ways and may assume many embodiments other than the preferred forms specifically set out and described above. Accordingly, it is intended by the appended claims to cover all such modification of the invention which fall within the true spirit and scope of the invention.

I claim:

1. A system for heating a fluid stored within a container comprising:
   a. a compressor for compressing and heating a fluorocarbon refrigerant;
   b. a heat exchanger coupled with said container and said compressor for transferring heat between the fluid and the refrigerant;
   c. means for circulating the fluid through said heat exchanger to transfer heat from the refrigerant through said heat exchanger to the fluid to thereby cool and condense the refrigerant from a gas to a liquid; and
   d. a coaxial earth tap having an input coupled to said heat exchanger, an output coupled to said compressor, and upper and lower ends, including:
      i. an inner passageway for transferring liquid refrigerant from the upper end to the lower end of said earth tap
      ii. restricting means coupled to the lower end of the inner passageway of said earth tap for maintaining the refrigerant within said inner passageway in a liquid state and for vaporizing the refrigerant as it is discharged from the lower end of the inner passageway, wherein the vaporized refrigerant discharged from the restricting means is in contact with the inner surface of the outer wall of the coaxial earth tap that is located below ground level;
      iii. an outer coaxial passageway thermally coupled with a heat source for transferring heat from said heat source to vaporize the refrigerant discharged from said restricting means and to increase the temperature of the refrigerant as the refrigerant travels from the lower end to the upper end of the outer passageway of said earth tap.

2. The system of claim 1 further including an elongated, linear heat exchanger having:
   a. a first passageway coupled at a first end to said compressor and at a second end to the outer passageway of said earth tap for transferring vaporized refrigerant from said earth tap to said compressor; and
   b. a second passageway coupled at a first end to said heat exchanger and at a second end to the inner passageway of said earth tap for transferring liquid refrigerant from said heat exchanger to said earth tap; Whereby heat is transferred from the liquid refrigerant flowing in a first direction through said linear heat exchanger into the vaporized refrigerant flowing in a second opposing direction through said linear heat exchanger.

3. The system of claim 1 wherein said circulating means includes a pump.

4. The system of claim 1 wherein said restricting means includes a capillary tube.

5. The system of claim 1 further including second restricting means coupled between said heat exchanger and said linear heat exchanger for restrcting the flow of refrigerant between said heat exchanger and said linear heat exchanger 6. The system of claim 1 wherein said compressor and said heat exchanger are positioned within said container for transferring heat from said compressor to the fluid 7. The system of claim 1 wherein said earth tap further includes an external housing for increasing the surface area of said earth tap in contact with said heat source.

8. The system of claim 1 where said circulating means includes a pump.

9. The system of claim 1 wherein said fluorocarbon is Freon.

10. The system of claim 1 wherein said restricting means includes a capillary tube.

11. The system of claim 1 further including second restricting means for restricting the flow of the refrigerant between said heat exchanger and said earth tap.

12. A fluid heating system comprising:
   a. a fluid storage container;
   b. a closed circuit having a flurocarbon refrigerant therein;
   c. means for compressing and circulating said refrigerant through said circuit;
   d. a heat exchanger coupled in said circuit and with said container for transferring heat from the refrigerant to the fluid to heat the fluid and to condense the refrigerant from a gas to a liquid;
   e. a coaxial earth tap heat exchanger having upper and lower ends coupled in said circuit between said heat exchanger and said compressor for transferring heat from the earth to the refrigerant including i. an inner passageway for transferring liquid refrigerant from the upper end to the lower end of said earth tap; ii. Restricting means coupled to the lower end of the inner passageway of said earth tap for maintaining the refrigerant within said inner passageway in a liquid state and for vaporizing the refrigerant as it is discharged from the lower end of the inner passageway, wherein the vaporized refrigerant discharged from the restricting means is in contact with the inner surface of the outer wall of the coaxial earth through out that portion of the inner surface of the coaxial earth tap that is located below ground level; iii. An outer coaxial passageway thermally coupled with a heat source for transferring heat from said heat source to vaporize the refrigerant discharged from said restricting means and to increase the temperature of the refrigerant as the refrigerant travels from the lower end to the upper end of the outer passageway of said earth tap; and
   f. an elongated, linear heat exchanger coupled in said circuit between said heat exchanger and said earth tap for transferring heat from the liquid refrigerant received from said heat exchanger to the vaporized refrigerant received from said earth tap, said linear heat exchanger having a bidirectional refrigerant flow and serving to physically couple together said compressor with said earth tap.

13. The system of clam 12 further including circuit restricting means coupled between the exit of said heat exchanger and the input port of said linear heat exchanger.

14. The system of claim 12 wherein said heat exchanger is helical in configuration.

15. The system recited in claim 12 wherein said restricting means comprises a capillary tube.

16. The system recited in claim 12 further comprising circuit restricting means between the exit of said heat exchanger and the entry port for said liquid refrigerant at said linear heat exchanger.

* * * * *